United States Patent
Knotts

[19]
[11] Patent Number: 5,988,292
[45] Date of Patent: Nov. 23, 1999

[54] GROUND TILLING DEVICE

[76] Inventor: Jerry Wayne Knotts, #Clubhouse Dr., Augusta, Kans. 67010

[21] Appl. No.: 08/999,050

[22] Filed: Dec. 29, 1997

[51] Int. Cl.$^6$ ................................................. A01B 33/00
[52] U.S. Cl. .............................. 172/41; 172/49; 172/378; 172/25
[58] Field of Search ................................. 172/41, 25, 42, 172/49, 52, 371, 378, 381; 366/343, 344, 129, 130

[56] References Cited

U.S. PATENT DOCUMENTS

| | | | |
|---|---|---|---|
| 201,287 | 3/1878 | Rathbun | 366/343 |
| 230,295 | 7/1880 | Linn | 366/343 |
| 2,082,476 | 6/1937 | Allen | 172/25 |
| 2,093,586 | 9/1937 | Day | 366/343 X |
| 3,129,771 | 4/1964 | Lidstone | 172/41 |
| 4,213,504 | 7/1980 | Schneider | 172/41 X |
| 4,988,303 | 1/1991 | Thomas | 366/285 |
| 5,330,010 | 7/1994 | Smotherman | 172/25 |

FOREIGN PATENT DOCUMENTS 160978   6/1933   Switzerland .............................. 172/25

*Primary Examiner*—Victor Batson
*Attorney, Agent, or Firm*—Kenneth Jack

[57] ABSTRACT

A rotatable tilling device for tilling ground material, the device consisting of a rotatable shaft having an upper end, a lower end, and having an axis of rotation extending from its upper end to its lower end; a plurality of ground tilling tines, each ground tilling tine having an upper end and a lower end; and, upper and lower tine mounting structure capable of attaching the ground tilling tines to the rotatable shaft so that they span between the tine mounting structure, so that upon rotation of the rotatable shaft the ground tilling tines orbit about the axis of rotation, so that on contact of the rotatable shaft with ground material, the ground tilling tines also contact the ground material, and so that the ground tilling tines may flexibly bend between the upper and lower tine mounting structure; the upper and lower tine mounting structure fixedly attaching the ground tilling tines to the rotatable shaft.

14 Claims, 3 Drawing Sheets

GROUND TILLING DEVICE

FIELD OF THE INVENTION

This invention relates to ground tilling devices. More particularly, this invention relates to ground tilling devices adapted for being rotatably driven by an electric hand drill.

BACKGROUND OF THE INVENTION

U.S. Pat. No. 3,129,771 issued Apr. 21, 1964, to Lidstone discloses a ground cultivating tool having an elongated drive shaft, the upper end of which is adapted for being rotatably driven by the chuck of an electric hand drill. At the lower end of the cultivating tool disclosed in Lidstone are a pair of ground agitating tines which are mounted upon the drive shaft so that they first extend perpendicularly from the drive shaft, and then extend downwardly at substantially right angles for engagement with ground material. A drawback or defect of the device disclosed in Lidstone is that the "elbow" or right angle of the tines is a structural weak point at which the tines tend to either permanently deform or fracture. Another drawback or deficiency of the cultivating tool disclosed in Lidstone is that the tool requires a diecast molding of the unitary tine and collar, which is not conducive to cost economy.

The instant inventive ground tilling device solves the above problems and deficiencies by providing a rotary drill driven ground tilling implement having a tine supporting structure which resists deformation and fracturing of tines and which is economically fabricated.

PRIOR ART PATENTS

U.S. Pat. No. 3,129,771 issued Apr. 21, 1964, to Lidstone discloses an electric drill driven cultivating tool.

U.S. Pat. No. 5,261,496 issued Nov. 16, 1993, to Smotherman discloses a tined apparatus for rotary extraction of weeds.

U.S. Pat. No. 4,723,802 issued Feb. 9, 1988, to Fambrough discloses a rotary drill driven weed extracting implement which utilizes the wings of common wingnuts as weed root engaging tines.

U.S. Pat. No. 4,213,504 issued Jul. 22, 1980, to Schneider discloses a rotary drill driven soil working apparatus.

U.S. Pat. No. 4,293,041 issued Oct. 6, 1981, to Holmstadt, et al., discloses a power cultivator tool having ground engaging tines.

U.S. Pat. No. 5,133,269 issued Jul. 28, 1992, to Charneski discloses a handheld rotary drill driven ground auger.

U.S. Pat. No. 4,305,470 issued Dec. 15, 1981, to Anderson discloses a handheld rotary drill driven hoe.

None of the above disclosed patents teach, describe, or disclose the novel, inventive, useful, and unique aspects, elements, and features of the present inventive ground tilling device.

SUMMARY OF THE INVENTION

A preferred embodiment of the present inventive ground tilling device comprises a hexagonal shaft, an upper tine supporting plate, a lower tine supporting plate, and six ground tilling tines; all preferably composed of carbon steel. The hexagonal shaft preferably is approximately 30 inches in length, and has a maximum cross-sectional dimension of 0.375 inches. The 0.375 inch dimension of the hexagonal shaft allows an end of the shaft to be inserted into the chuck of a three-eighths inch handheld electric drill. Upon installation of an end of the hexagonal shaft into the chuck of a three-eighths inch electric drill, the combined lengths of the hexagonal shaft and the drill allow an average sized person to grasp the drill and, without stooping, extend the drill and the hexagonal shaft downward, causing the lower end of the hexagonal shaft to contact the ground. The lower end of the hexagonal shaft preferably is tapered to a conical point.

The upper tine supporting plate preferably is circular, having a thickness of approximately 0.125 inches and having an outside diameter of approximately 1.75 inches. An hexagonal aperture matching the cross-sectional shape of the hexagonal shaft is stamped axially through the upper tine supporting plate, and six tine supporting apertures are stamped through the plate in an hexagonal configuration surrounding the hexagonal shaft receiving aperture. The hexagonal configurations of the hexagonal shaft and hexagonal aperture serve as a rotation stop. Preferably, the tine receiving apertures of the upper tine supporting plate are 0.25 inches in diameter for closely receiving and retaining cylindrical tines, having a 0.25 inch diameter.

The lower tine supporting plate also is preferably circular, having a thickness of 0.125 inches, and a larger diameter of 2.5 inches. An hexagonal aperture matching the cross-sectional shape of the hexagonal shaft is stamped axially through the lower tine supporting plate and six tine receiving apertures are stamped through the plate in an hexagonal pattern surrounding the hexagonal shaft receiving aperture. Preferably, the tine receiving apertures of the lower tine supporting plate are 0.3125 inches in diameter for slidably receiving the 0.25 inch tines.

The upper and lower tine supporting plates are mounted over the hexagonal shaft with the shaft extending through their hexagonal shaft receiving apertures. The upper tine supporting plate is positioned approximately 9.5 inches above the lower end of the hexagonal shaft and the lower tine supporting plate is positioned approximately 7 inches below the upper tine supporting plate. The tine supporting plates are then welded in place at those positions, the welds preferably being located at the lower surfaces of the tine supporting plates.

Each of the six tines preferably are 9 inches in length, and have a circular cross-sectional shape with a diameter of 0.25 inches. The tines are slidably extended upwardly through the tine receiving apertures of the lower tine supporting plate until the upper ends of the tines lodge within the tine receiving apertures of the upper tine supporting plate. The upper ends of the tines are positioned so that they are flush with the upper surface of the upper tine supporting plate, and the tines are there welded in place, the welds preferably being on the upper surfaces of the tines and the upper tine supporting plate.

The positioning and angular orientation of the tines with respect to the hexagonal shaft is controlled by the positioning of the tine receiving apertures within the upper and lower tine supporting plates, and by the positioning of the tine supporting plates upon the hexagonal shaft. Preferably, the lower end of the hexagonal shaft extends downwardly to an elevation below the lower ends of the tines. The fixed attachment of the upper tine supporting plate approximately nine and one-half inches above the lower end of the hexagonal shaft assures such a configuration. Also preferably, each of the six tines extend from the upper tine supporting plate both outwardly and in a direction away from the direction of ordinary rotation of an electric handheld drill. Such outward extension of the tines is accomplished through placement of the tine receiving apertures near the outer peripheries of the upper and lower tine supporting plates, allowing the differential in their diameters to extend the tines outwardly at an acute angle. Normal rotation of a common handheld drill is clockwise. Thus, it is preferable that each tine extend counter-clockwise at an acute angle from its upper mount. Assuming that the upper and lower tine supporting plates have their apertures located at "twelve o'clock", "two o'clock", "four o'clock", "six o'clock", "eight o'clock", and "ten o'clock" positions, a tine whose upper end is mounted within the "twelve o'clock" tine receiving aperture of the upper tine supporting plate preferably extends downwardly through the "ten o'clock" tine receiving aperture of the lower tine supporting plate. All five other tines are similarly, angularly mounted.

In operation of the ground tilling device, an operator inserts the upper end of the hexagonal shaft into an opened chuck of a three-eighths inch electric drill and tightens the chuck onto the shaft. The operator then grasps the drill in either one or two hands and actuates the drill to cause the tilling device to spin in a clockwise direction. The operator then extends the ground tilling device downward until the lower ends of the hexagonal shaft and the tines engage the ground. Upon contact of the lower end of the hexagonal shaft with the ground, the spinning tines efficiently churn and break up encrusted ground material. Where the tines come into contact with undesirable weeds and grasses, the churning and spinning action of the tines effectively pulls such vegetation from the ground.

In the event one of the tines strikes a stone or other hard object while spinning, the sliding connection between the tine and the lower tine supporting plate allows the tine to flexibly bend along its full length rather than deform or fracture.

Alternate suitable configurations of the ground tilling device utilize tines fewer in number or greater in number than the six tine configuration described above. The tines may also be suitably oriented so that the longitudinal axis of each tine lies within a plane which contains the axis of rotation of the hexagonal shaft.

Accordingly, it is an object of the present invention to provide an handheld drill driven ground tilling device providing for a downward extension of a plurality of ground tilling tines, and providing for an upper fixed tine support and a lower slidable tine support, allowing for flexible bending of the tines while preventing fractures and permanent deformations of the tines.

It is a further object of the present invention to provide such a ground tilling device which is simply and economically constructed and fabricated.

Other and further object benefits and advantages of the present inventive ground tilling device will become known to those skilled in the art upon review of the Detailed Description which follows, and upon review of the appended drawings.

DETAILED DESCRIPTION OF THE PREFERRED EMBODIMENT

Figure 1:
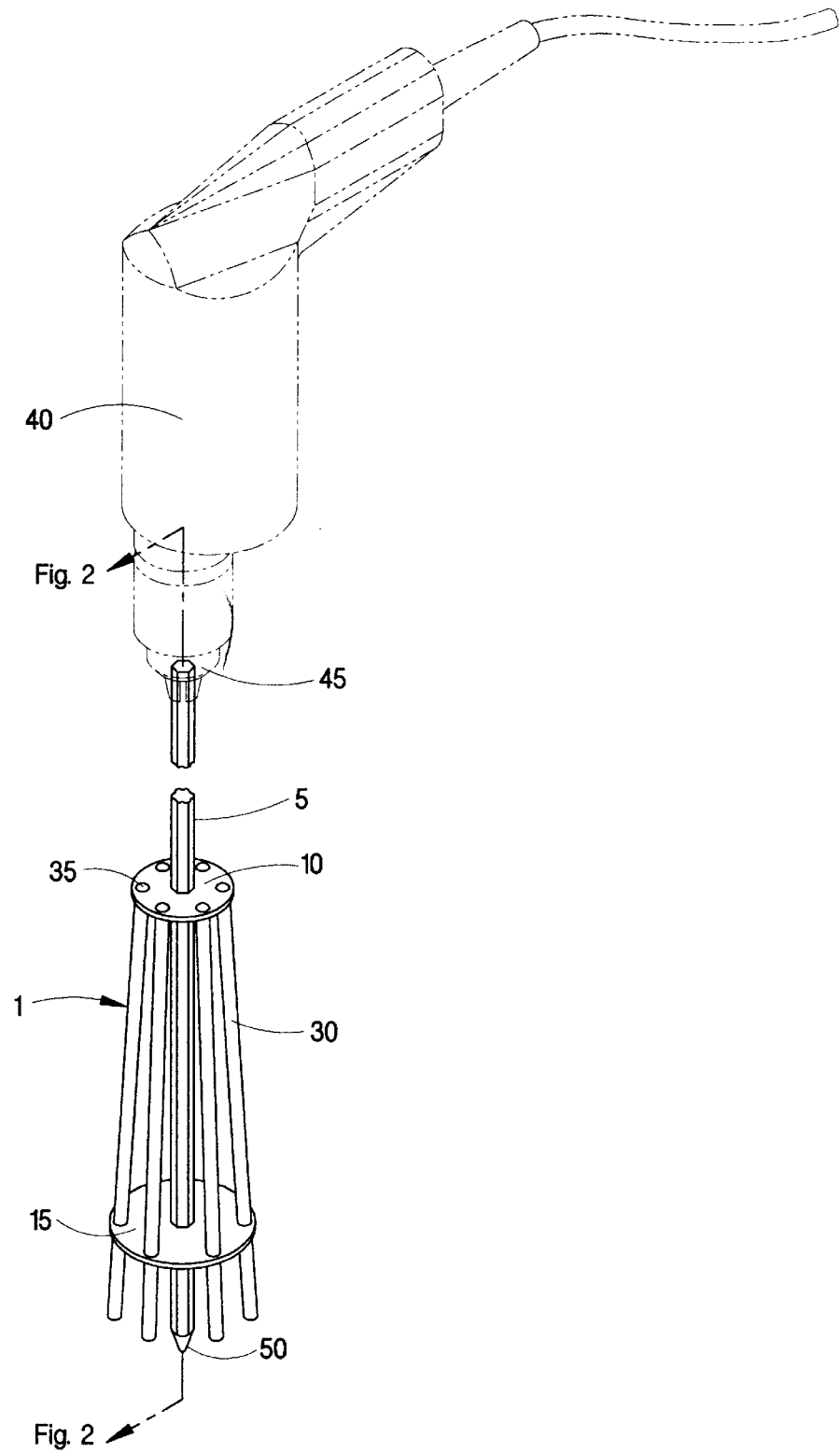
FIG. 1 is an isometric view of the present inventive ground tilling device.
Figure 2:
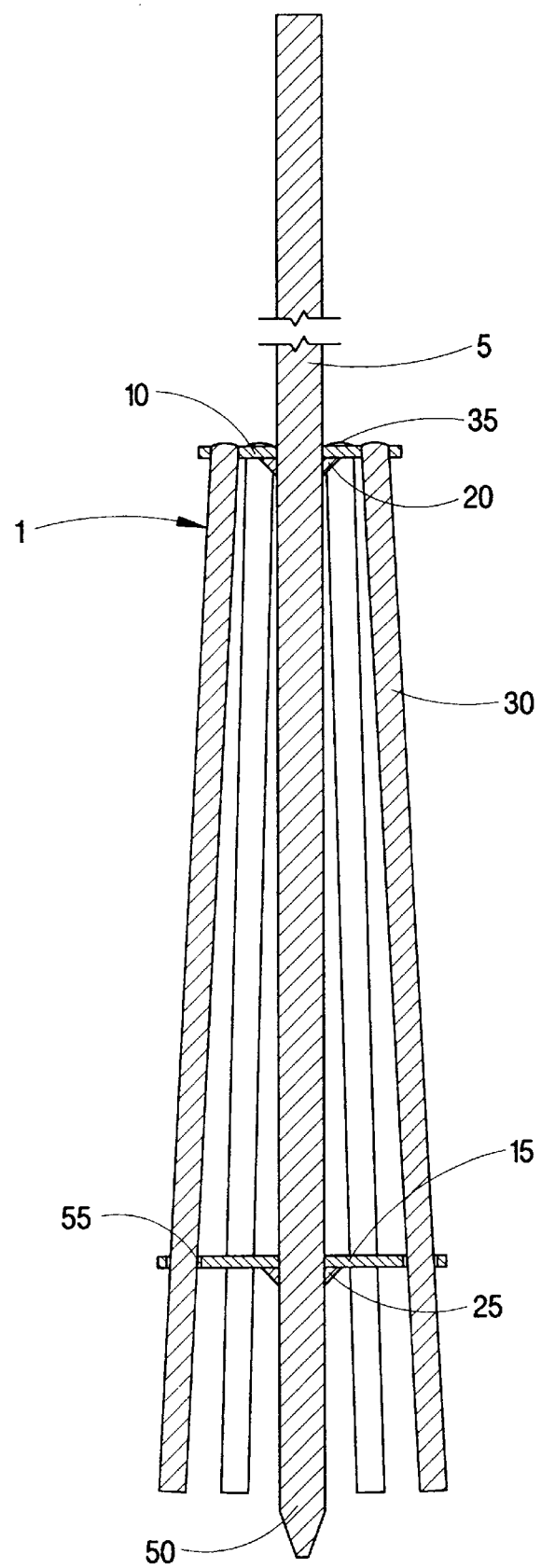
FIG. 2 is a sectional view of the present inventive ground tilling device, the plane of the section extending through the axis of rotation of the hexagonal shaft of the device.

Referring now to the drawings, and in particular to FIG. 1, the ground tilling device is referred to generally by Drawing Element 1. The major structural element of the ground tilling device 1 is a steel hexagonal shaft 5 whose upper end is sized and adapted for mounting within the chuck 45 of an electric hand drill 40. An upper tine supporting plate 10 having an hexagonal aperture therethrough is fixedly mounted over the steel hexagonal shaft 5 by means of, referred to FIG. 2, a heat fusion weld 20. Referring again to FIG. 1, a lower tine supporting plate 15 having an hexagonal aperture therethrough is mounted upon the steel hexagonal shaft 5 below the upper tine supporting plate 10 by means of, referring to FIG. 2, a heat fusion weld 25. A plurality of ground tilling tines 30, preferably six, extend through tine receiving apertures 55 of the lower tine supporting plate 15, and thence further extend upwardly to lodge within closely fitted tine receiving apertures within the upper tine supporting plate 10. Referring simultaneously to FIGS. 1 and 2, the upper end of each ground tilling tine 30 is fixedly attached to the upper tine supporting plate 10 by means of heat fusion welds 35.

Figure 3:
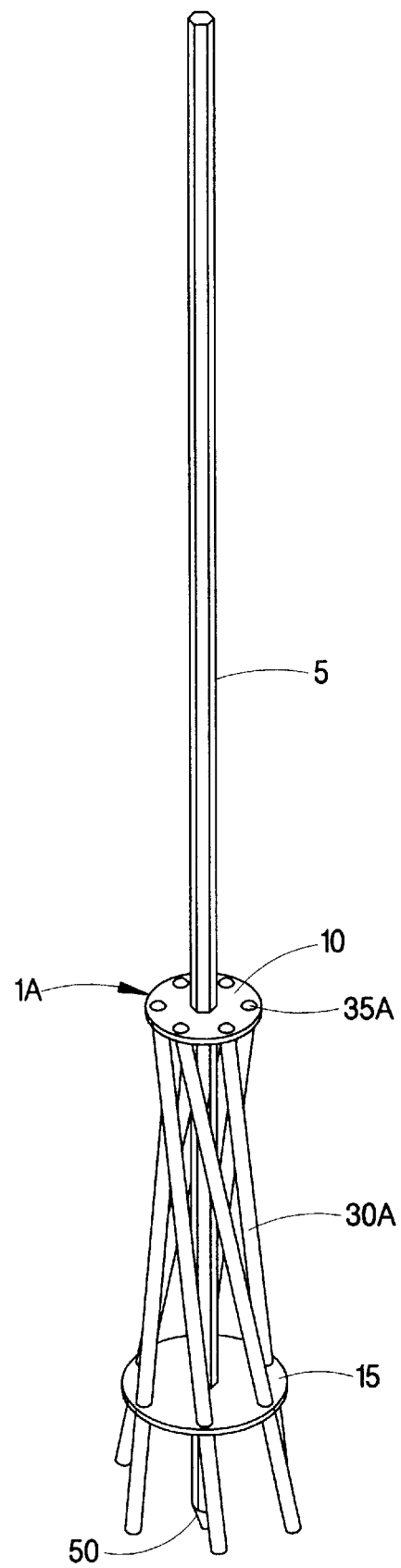
FIG. 3 is an isometric view of a preferred alternate configuration of the present inventive ground tilling device.

Referring to FIG. 3, representing an alternate preferred embodiment 1A of the ground tilling device, all elements and features are identical to those depicted in FIGS. 1 and 2 with the exception that each of the ground tilling tines 30A, angularly extend counter-clockwise from the lower tine supporting plate 15 to the next preceding tine receiving aperture of the upper tine supporting plate 10, to be there welded in place by an heat fusion weld 35A.

Preferably, all components of the ground tilling device are composed of high strength carbon steel. In operation, referring to FIG. 1, the upper end of the steel hexagonal shaft 5 of the ground tilling device 1 is fixedly mounted within the chuck 45 of an electric hand drill 40. The drill 40 is then operated to cause the ground tilling device 1 to rotate about an axis of rotation extending through the steel hexagonal shaft 5. While the ground tilling device 1 spins, the tapered point 50 of the ground tilling device 1 is inserted into ground to be tilled, causing the lower ends of the ground tilling tines 30 to churn and till the ground. Upon engagement of the lower ends of the ground tilling tines 30 with weeds or grass, such undesirable vegetation is efficiently pulled from the ground.

Referring simultaneously to FIGS. 2 and 3, in the event the lower end of a ground tilling tine 30 or 30A comes into contact with a stone or other hard object, the tine may slidably move within its tine receiving aperture 55 extending through the lower tine supporting plate 15. Such slidable motion allows the ground tilling tine 30 or 30A to flexibly bend along its entire length, preventing permanent deformation or fracturing of the tine.

Alternate suitable configurations of the ground tilling device may utilize a lesser or greater number of ground tilling tines.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A rotatable tilling device for tilling ground material, the device comprising:
   (a) A rotatable shaft having an upper end, a lower end, and having an axis of rotation extending from its upper end to its lower end;

(b) A plurality of ground tilling tines, each ground tilling tine having an upper end and a lower end; and, (c) Upper tine mounting means and lower tine mounting means, the upper and lower tine mounting means being capable of fixedly attaching the ground tilling tines to the rotatable shaft so that the ground tilling tines span between the upper and lower tine mounting means, so that the lower ends of the ground tilling tines project downwardly from the lower tine mounting means and are spaced apart from each other, so that upon rotation of the rotatable shaft about its axis of rotation, each ground tilling tine orbits about said axis of rotation, so that upon contact of the lower end of the rotatable shaft with the ground material, the lower ends of the ground tilling tines may also contact the ground material, and so that upon such contact and upon such rotation the ground tilling tines may flexibly bend between the upper and lower tine mounting means; the upper and lower tine mounting means fixedly attaching the ground tilling tines to the rotatable shaft.

2. The device of claim 1, wherein the lower tine mounting means comprises a lower tine supporting plate having an upper surface and a lower surface, and having a shaft receiving aperture extending from its upper surface to its lower surface, the shaft receiving aperture of the lower tine supporting plate being fitted for receiving the rotatable shaft, the lower tine supporting plate being fixedly mounted over the rotatable shaft.

3. The device of claim 2, wherein the upper tine mounting means comprises an upper tine supporting plate having an upper surface and a lower surface, and having a shaft receiving aperture extending from its upper surface to its lower surface, the shaft receiving aperture of the upper tine supporting plate being fitted for receiving the rotatable shaft, the upper tine supporting plate being fixedly mounted over the rotatable shaft and positioned thereon above the lower tine supporting plate.

4. The device of claim 3, wherein the lower tine supporting plate has a plurality of lower tine receiving apertures extending from the lower tine supporting plate's upper surface to its lower surface, and wherein each ground tilling tine extends through a lower tine receiving aperture.

5. The device of claim 4, wherein the upper tine supporting plate has a plurality of upper tine receiving apertures extending from the upper tine supporting plate's upper surface to its lower surface, the upper end of each ground tilling tine being fixedly mounted within an upper tine receiving aperture.

6. The device of claim 5, wherein the rotatable shaft has an outer peripheral surface, wherein the shaft receiving apertures of the upper and lower tine supporting plates have inwardly facing surfaces, and wherein the outer peripheral surface of the rotatable shaft and the inwardly facing surfaces of the shaft receiving apertures of the upper and lower tine supporting plates are configured with respect to each other to form rotation stops for prevention of rotation of the upper and lower tine supporting plates with respect to the rotatable shaft.

7. The device of claim 6, wherein the rotatable shaft has a hexagonal lateral cross-sectional shape, and wherein the shaft receiving apertures of the upper and lower tine supporting plates are hexagonal.

8. The device of claim 7, wherein each of the ground tilling tines extending through the tine receiving apertures of the lower tine supporting plates are slidably mounted therethrough.

9. A rotatable tilling device for tilling ground material, the device comprising:

(a) a rotatable shaft having an upper end, a lower end, and having an axis of rotation extending from its upper end to its lower end;

(b) a plurality of ground tilling tines, each ground tilling tine having an upper end and a lower end; and, (c) upper tine mounting means and lower tine mounting means, the upper and lower tine mounting means being capable of fixedly attaching the ground tilling tines to the rotatable shaft so that the ground tilling tines span between the upper and lower tine mounting means, so that upon rotation of the rotatable shaft about its axis of rotation, each ground tilling tine orbits about said axis of rotation, so that upon contact of the lower end of the rotatable shaft with the ground material, the lower ends of the ground tilling tines may also contact the ground material, and so that upon such contact and upon such rotation the ground tilling tines may flexibly bend between the upper and lower tine mounting means; the upper and lower tine mounting means fixedly attaching the ground tilling tines to the rotatable shaft; the lower tine mounting means comprising a lower tine supporting plate having an upper surface and a lower surface, and having a shaft receiving aperture extending from its upper surface to its lower surface, the shaft receiving aperture of the lower tine supporting plate being fitted for receiving the rotatable shaft, the lower tine supporting plate being fixedly mounted over the rotatable shaft; the upper tine mounting means comprising an upper tine supporting plate having an upper surface and a lower surface, and having a shaft receiving aperture extending from its upper surface to its lower surface, the shaft receiving aperture of the upper tine supporting plate being fitted for receiving the rotatable shaft, the upper tine supporting plate being fixedly mounted over the rotatable shaft and positioned thereon above the lower tine supporting plate; the lower tine supporting plate having a plurality of lower tine receiving apertures extending from the lower tine supporting plate's upper surface to its lower surface, each ground tilling tine extending through a lower tine receiving aperture; the upper tine supporting plate having a plurality of upper tine receiving apertures extending from the upper tine supporting plate's upper surface to its lower surface, the upper end of each ground tilling tine being fixedly mounted within an upper tine receiving aperture; the rotatable shaft having an outer peripheral surface, wherein the shaft receiving apertures of the upper and lower tine supporting plates have inwardly facing surfaces, and wherein the outer peripheral surface of the rotatable shaft and the inwardly facing surfaces of the shaft receiving apertures of the upper and lower tine supporting plates are configured with respect to each other to form rotation stops for prevention of rotation of the upper and lower tine supporting plates with respect to the rotatable shaft; the rotatable shaft having a hexagonal lateral cross-sectional shape, the shaft receiving apertures of the upper and lower tine supporting plates being hexagonal; each of the ground tilling tines extending through the tine receiving apertures of the lower tine supporting plates being slidably mounted therethrough; the tine receiving apertures of the upper and lower tine supporting plates being positioned so that the upper ends of the ground tilling tines are closer to the axis of rotation of the rotatable shaft than their lower ends.

10. The device of claim 9, wherein the lower ends of the ground tilling tines are positioned above the lower end of the rotatable shaft.

11. The device of claim 10, wherein the fixed mounts of the upper and lower tine supporting plates upon the rotatable shaft comprise heat fusion welds.

12. The device of claim 11, wherein the fixed mounts of the upper ends of the ground tilling tines within the upper tine receiving apertures of the upper tine supporting plate comprise heat fusion welds.

13. The device of claim 12, wherein the lower end of the rotatable shaft forms a point.

14. The device of claim 13, wherein the rotatable shaft and the ground tilling tines are composed of steel.

* * * * *